May 28, 1963    L. STRAUCH    3,091,248
COMB BRUSH AND CASING ASSEMBLY
Filed Oct. 12, 1961    2 Sheets-Sheet 2
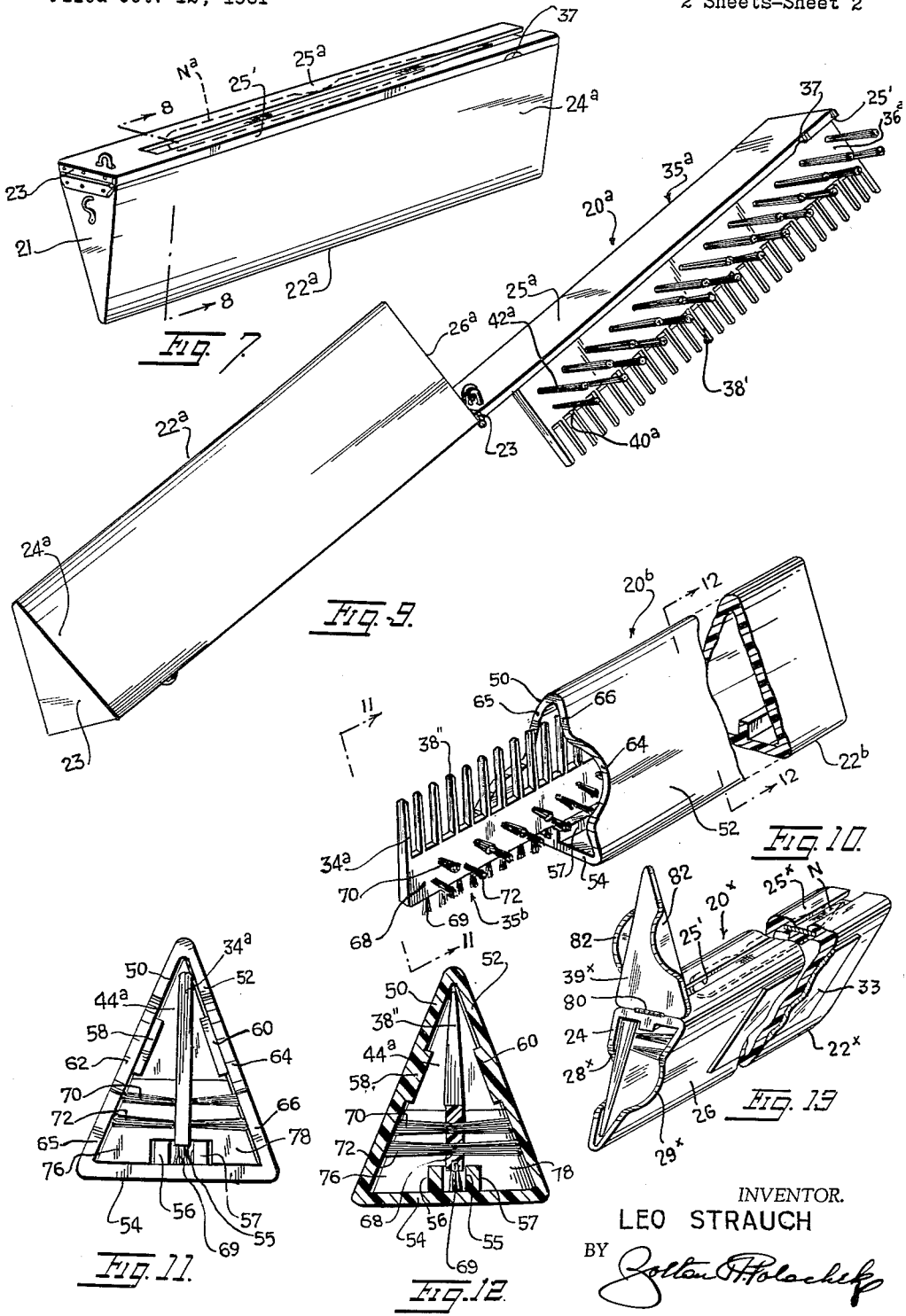
INVENTOR.
LEO STRAUCH
BY
ATTORNEY United States Patent Office 3,091,248
Patented May 28, 1963

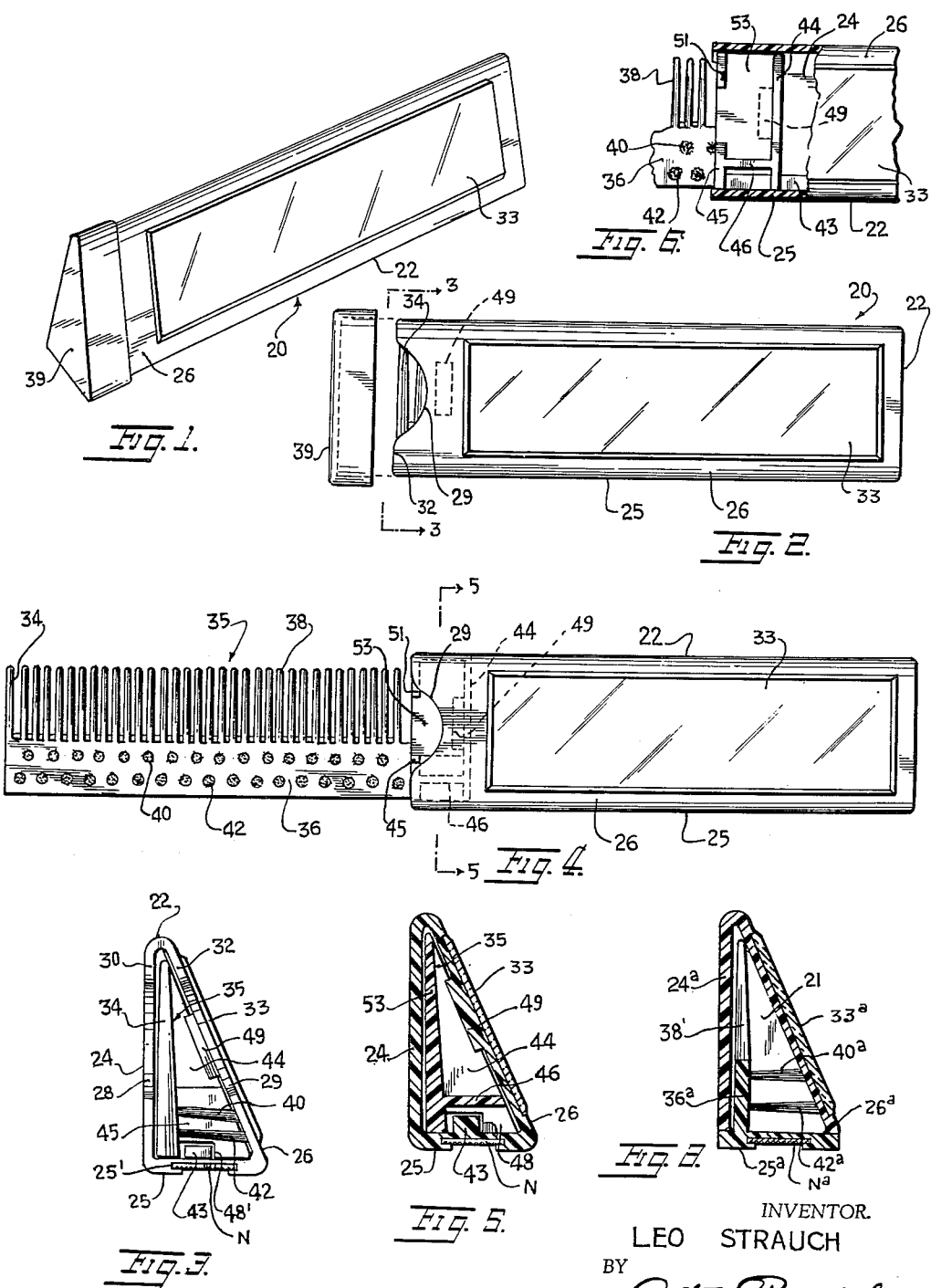

3,091,248
COMB BRUSH AND CASING ASSEMBLY
Leo Strauch, 1733 160th St., Whitestone, N. Y.
Filed Oct. 12, 1961, Ser. No. 144,787
3 Claims. (Cl. 132—103)

This invention concerns a combined comb, brush, mirror, nail file, lipstick or the like, and casing therefor.

According to the invention there is provided a casing in which is disposed a combined comb and brush unit or member. The unit is slidable or pivotally disposed in the casing and can be pushed or pulled out of the casing for use. The casing will serve as a handle for the comb-brush assembly. The casing also carries a stationary or movable mirror, nail file, lipstick or the like.

It is therefore one object of the invention to provide a comb, brush, mirror and nail file assembly including a casing with a comb-brush unit disposed in the casing and movable out of the casing for use, the casing serving as a handle for the open assembly.

Another object is to provide a comb-brush unit or member having a back with flexible teeth integrally formed on the back and with brush bristles extending laterally from one or both sides of the back.

A further object is to provide a comb, brush, mirror and nail file assembly including a casing having a ridge or ridges therein adapted to guide a comb-brush unit or member for slidable movement in and out of the casing, and including a stop element to limit outward movement of the member from the casing.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a comb, brush, mirror and nail file assembly embodying the invention, the assembly being shown in closed position.

FIG. 2 is a front elevational view of the assembly with the end cover separated therefrom.

FIG. 3 is an end elevational view on an enlarged scale of the assembly as seen from the line 3—3 of FIG. 2.

FIG. 4 is a front elevational view of the assembly in open position.

FIG. 5 is a sectional view on an enlarged scale taken on line 5—5 of FIG. 4.

FIG. 6 is a fragmentary front elevational view of the open assembly, with parts of the casing broken away.

FIG. 7 is a perspective view of a comb and brush assembly embodying a modified form of the invention, shown in closed position.

FIG. 8 is a sectional view taken on line 8—8 of FIG. 7.

FIG. 9 is a perspective view of the assembly of FIG. 7 in open position.

FIG. 10 is a fragmentary perspective view of a comb and brush assembly according to another modification of the invention, the assembly being shown partially open and parts being shown broken away.

FIG. 11 is an end view as seen from the line 11—11 of FIG. 10.

FIG. 12 is a sectional view taken on line 12—12 of FIG. 10.

FIG. 13 is a perspective view of another modified form of combined comb, brush, mirror and nail file assembly, the end cover shown open, and parts being shown broken away.

In FIGS. 1–6, there is shown a comb, brush, mirror and nail file assembly 20 which includes an elongated, tubular casing 22 open at opposite ends. The casing is triangular in cross section with a rectangular back wall 24, a rectangular bottom wall 25 perpendicular to the back wall, and a rectangular front wall 26 integral at opposite edges with the back and bottom walls. Notches 28 and 29 are formed at edges 30, 32 of walls 24, 26. At these notches there is exposed an upstanding rigid tooth 34 of a comb-brush unit 35. A mirror 33 of rectangular shape is secured to the outer side of front wall 26 by adhesive or in any suitable manner.

The bottom wall 25 is formed with a recess 25' which opens outwardly at the notched end of the casing to receive slidably a nail file N.

The comb-brush unit or member has an elongated back 36. Integrally formed with the back 36 are upstanding flexible teeth 38 defining a comb. Extending laterally and perpendicularly of the back 36 are two parallel rows of bristles 40, 42, arranged in staggered relation, defining a brush. The bristles 40 are shorter than bristles 42 and the edges of the bristles abut the inner side of front wall 26 when the assembly is closed. At its distal end, the member 35 has a triangular end plate 44 which is reinforced by a crossbar 46 extending between plate 44 and a brace plate 45. The brace plate is trapezoidal in form and extends upward from the perpendicular to the back 36.

Aligned rectangular recesses 48, 48' are formed in the bottom edges of plates 44 and 45, respectively. A ridge 43 is integrally formed with the bottom wall 25 of the casing and serves as a guide for sliding movement of the comb-brush unit. The ridge extends through the recesses 48, 48' of the plates 44, 45 which ride on the bottom wall 25 and are guided by the ridge. Triangular guide element 51 is coplanar with plate 44 on end plate 53 of unit 35.

The staggered bristles 40, 42 frictionally engage the inner side of front wall 26 preventing the unit 35 from sliding out of the casing. A triangular cap 39 fits over one open end of the casing while plate 44 closes the other open end of the casing. A rectangular projection 49 is located on the inner side of wall 26 near notch 29 and serves as a stop element to prevent the unit 35 from sliding out of the casing. When the assembly is open as shown in FIGS. 4–6, the plate 44 abuts projection 49. In the open position of the assembly as shown in the drawing, the casing serves as a handle enabling the assembly to serve as a comb and brush.

In FIGS. 7–9 is shown a modified form of comb, brush, mirror and nail file assembly 20$^a$ in which the comb-brush unit 35$^a$ includes a rectangular base plate 25$^a$ hinged to end wall 21 of the casing 22$^a$ by a hinge 23. Plate 25$^a$ is grooved to slidably receive the nail file N$^a$. The casing has two angularly disposed front and rear rectangular walls 26$^a$ and 24$^a$ and an open bottom which is closed by the base plate 25$^a$. Mirror 33$^a$ is on front wall 26$^a$. The back 36$^a$ of the comb-brush unit 35$^a$ is integral with plate 25$^a$ and extends perpendicularly thereto. Flexible teeth 38' are integral with back 36$^a$. Bristles 40$^a$, 42$^a$ frictionally engage front wall 26$^a$. It will be noted that the bristles are arranged in staggered relation.

Notches 37 in the edges 25' of plate 25$^a$ facilitate opening the assembly to the position of FIG. 9. In the open position casing 22$^a$ serves as a handle for the comb-brush unit 35$^a$. The casing has another triangular end wall 23 which closes the casing and reinforces the structure.

In FIGS. 10–12, the comb and brush assembly 20$^b$ has a slidable comb-brush unit 35$^b$ in casing 22$^b$. The casing in cross section has generally the form of an isosceles triangle with opposing lateral walls 50, 52 and a bottom wall 54. A longitudinal groove 55 is defined between two parallel ridges 56 and 57 inside of wall 54. Two projecting stop elements 58, 60 are formed at one open end of the casing near notches 62, 64 on the edges 65, 66 of walls 50, 52.

Back 68 of the comb-brush unit extends into groove 55. A row of bristles 69 are embedded in the edge of back 68 and frictionally engage the bottom wall 54 in groove 55. These short bristles 69 may serve as a fingernail brush, eyebrow or eyelash brush or the like. Bristles 70, 72 are arranged in staggered relation in two parallel rows extending laterally from opposite sides of the back 68. Bristles 70 are shorter than bristles 72 and these bristles frictionally engage the inner sides of walls 50, 52. Tooth 34ª is exposed at notches 62, 64 and can be gripped for pulling the unit 35ᵇ out of the casing. A triangular stop plate 44ª is located at the distal end of the unit 35ᵇ integral with back 68. This plate 44ª is reinforced by brace plates 76, 78. Extension of the comb-brush unit is limited by abutment of plate 44ª against stop elements 58, 60.

When the comb-brush unit 35ᵇ is extended from the casing 22ᵇ, the flexible teeth 38″ can be used as a comb, and the bristles 69, 70 and 72 can be used as brushes for various purposes.

Retraction of the unit 35ᵇ is effected by pushing it longitudinally into the casing 22ᵇ. A cap 39, as shown in FIG. 1, may be provided to close the open end of casing 22ᵇ. Plate 44ª closes the other end of the casing. When the assembly is open, the casing 22ᵇ serves as a handle for the comb-brush unit.

The modified form of comb, brush, mirror and nail file assembly 20ˣ illustrated in FIG. 13 differs from the assembly 20 shown in FIGS. 1 to 6, inclusive, in that instead of a removable cap such as the cap 39 on one end of the casing 22ˣ, the cap 39ˣ is hingedly mounted on the end of the bottom wall 25ˣ by means of a hinge 80. Ears 82 project from the long edges of the cap and are adapted to project into the notches 28ˣ and 29ˣ in the adjacent end of the casing to seal off the end.

In all other respects assembly 20ˣ is similar to assembly 20 and similar reference numerals are used to indicate similar parts.

The assembly in each form described serves as a handy, personal grooming accessory. It can be manufactured at low cost by well known mass production machinery.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new and desire to secure by United States Letters Patent is:

1. A personal accessory, comprising a tubular casing with opposite open ends, said casing having front, rear and bottom walls integrally joined and forming a structure substantially triangular in cross section, and a comb-brush member slidably disposed in said casing, said member having an elongated back extending along said bottom wall when the member is retracted in the casing, flexible teeth integral with said back defining a comb, and a plurality of rows of bristles secured in said elongated back and extending laterally thereof to frictionally engage the front wall when the member is retracted in the casing, said bottom wall having a ridge thereon for guiding said back in sliding movement into and out of the casing, a stop element formed inside of one of the walls, a triangular plate integral with the back of said member and extending perpendicular thereto for engaging said stop element to limit outward sliding movement of said member from the casing, said casing serving as a handle for said member when said member is extended from the casing, a mirror on the front wall of said casing and a removable nail file on the bottom wall of the casing.

2. A personal accessory, comprising a tubular casing with opposite open ends, said casing having front, rear and bottom walls integrally joined and forming a structure substantially triangular in cross section, and a comb-brush member slidably disposed in said casing, said member having an elongated back extending along said bottom wall when the member is retracted in the casing, flexible teeth integral with said back defining a comb, and a plurality of rows of bristles secured in said elongated back and extending laterally on both sides of the back to frictionally engage the front and rear walls when the member is retracted in the casing, said bottom wall having two spaced ridges thereon defining a central groove inside the casing, said back fitting in said groove, a stop element formed inside one of said walls, and a triangular plate integral with the back of said member and extending perpendicular thereto for engaging said stop element to limit outward sliding movement of said member from the casing.

3. A personal accessory, comprising a tubular casing with opposite open ends, said casing having front, rear and bottom walls integrally joined and forming a structure substantially triangular in cross section, and a comb-brush member slidably disposed in said casing, said member having an elongated back extending along said bottom wall when the member is retracted in the casing, flexible teeth integral with said back defining a comb, and a plurality of rows of bristles secured in said elongated back and extending laterally on both sides of the back to frictionally engage the front and rear walls when the member is retracted in the casing, said bottom wall having two spaced ridges thereon defining a central groove inside the casing, said back fitting in said groove, a stop element formed inside one of said walls, and a triangular plate integral with the back of said member and extending perpendicular thereto for engaging said stop element to limit outward sliding movement of said member from the casing, said back having a row of short bristles embedded in a longitudinal edge thereof and frictionally engaging the bottom wall in said groove, said casing serving as a handle for said member when said member is extended from the casing.

References Cited in the file of this patent

UNITED STATES PATENTS

| | | |
|---|---|---|
| 375,683 | Raffel | Dec. 27, 1887 |
| 1,127,746 | Dunham | Feb. 9, 1915 |
| 1,411,437 | Jaroski | Apr. 4, 1922 |
| 2,110,514 | Wakefield | Mar. 8, 1938 |
| 2,139,688 | Mackenzie-Kennedy | Dec. 13, 1938 |